US008661510B2

(12) United States Patent
Wang et al.

(10) Patent No.: US 8,661,510 B2
(45) Date of Patent: Feb. 25, 2014

(54) TOPOLOGY BASED FAST SECURED ACCESS (75) Inventors: Xing Lin Wang, Beijing (CN); Lei Li, Beijing (CN); Xue Gang Huang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 117 days.

(21) Appl. No.: 13/263,994

(22) PCT Filed: May 5, 2009

(86) PCT No.: PCT/EP2009/003221
§ 371 (c)(1),
(2), (4) Date: Oct. 12, 2011

(87) PCT Pub. No.: WO2010/127684
PCT Pub. Date: Nov. 11, 2010

(65) Prior Publication Data
US 2012/0036560 A1 Feb. 9, 2012

(51) Int. Cl.
G06F 7/04 (2006.01)
G06F 15/16 (2006.01)
H04L 29/06 (2006.01)
G06F 12/00 (2006.01)
G06F 12/14 (2006.01)
G06F 13/00 (2006.01)
G06F 17/30 (2006.01)
G11C 7/00 (2006.01)

(52) U.S. Cl.
USPC .............................................. 726/4; 726/21

(58) Field of Classification Search
USPC .................................................... 726/4, 21
See application file for complete search history.

(56) References Cited

U.S. PATENT DOCUMENTS

| 2007/0206537 | A1* | 9/2007 | Cam-Winget et al. | 370/331 |
| 2007/0250713 | A1* | 10/2007 | Rahman et al. | 713/171 |
| 2008/0043637 | A1* | 2/2008 | Rahman | 370/254 |
| 2008/0263647 | A1* | 10/2008 | Barnett et al. | 726/6 |

FOREIGN PATENT DOCUMENTS

WO 2008/080420 7/2008

OTHER PUBLICATIONS

International Search Report and Written Opinion corresponding to International Application No. PCT/EP2009/003221 dated Jun. 7, 2010.
Chanil Park et al, "Pre-Authentication for Fast Handoff in Wireless Mesh Networks with Mobile APs," Aug. 28, 2006, Information Security Applications; [Lecture Notes in Computer Science;;LNCS], Heidelberg, Berlin, pp. 349-363, XP019077675.
Khan et al, "Authentication in Multi-Hop Wireless Mesh Networks," World of Academy of Sciences, Engineering and Technology, 2006, pp. 100-105, XP002583354.

(Continued)

Primary Examiner — Linglan Edwards
Assistant Examiner — Lawrence Cosby
(74) Attorney, Agent, or Firm — Squire Sanders (US) LLP (57) ABSTRACT The present invention relates to methods, apparatuses, and computer program products for providing secure access for a user or terminal to a network, wherein an intermediate authentication node is authorized to listen to and store authentication related information. When an authentication request is received, the stored authentication related information is checked and the user or terminal is authenticated if a match between authentication related information of the authentication request and the stored authentication related information is determined, and an authentication server responsible for the authentication request is notified about the authentication result.

21 Claims, 9 Drawing Sheets

(56) References Cited

OTHER PUBLICATIONS

V. Narayanan, et al., Network Working Group, RFC5296, "EAP Extensions for EAP Re-Authentication Protocol (ERP)", Qualcomm, Inc., Aug. 2008, pp. 1-44.

Mishra et al, "Proactive Key Distribution Using Neighbor Graphs," IEEE Wireless Communications, vol. 11, issue 1, Feb. 2004, 11 pp.

IEEE Standard 802.1X-2001, IEEE Standard for Local and Metropolitan Area Networks, "Port-Based Network Access Control", 2009, IEEE Computer Society, pp. 1-142.

IEEE 802.16-2004 Part 16: Air Interface for Fixed Broadband Wireless Access Systems; IEEE Computer Society, Oct. 1, 2004, pp. 1-893.

IEEE 802.11 Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Computer Society, IEEE Std. 802.11-2007, (Jun. 12, 2007), pp. 1-1232.

IEEE Std 802.15.1™-2002, IEEE Standard for Information technology—Telecommunications and information exchange between systems—Local and metropolitan area networks—Specific requirements, Part 15.1: Wireless Medium Access Control (MAC) and Physical Layer (PHY) Specifications for Wireless Personal Area Networks (WPANs), Jun. 14, 2002, pp. 1-1169.

\* cited by examiner

TOPOLOGY BASED FAST SECURED ACCESS

FIELD OF THE INVENTION

The present invention relates to methods, apparatuses, computer program products and a system for providing authentication, authorization or other types of secured access in a network, such as—but not limited to—a wireless mesh network (WMN).

BACKGROUND OF THE INVENTION

Figure 1:
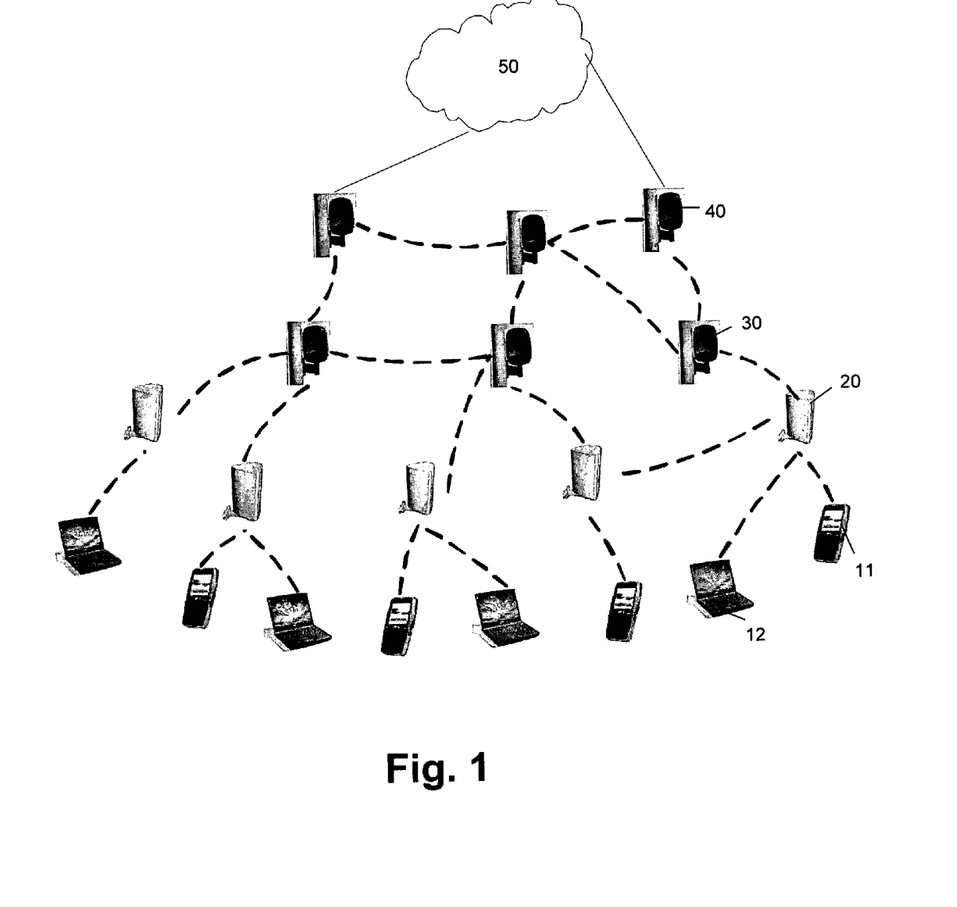
FIG. 1 shows a schematic network architecture of a wireless mesh network structure in which some embodiments can be implemented.

In a WMN, client devices or clients (e.g. computers or mobile phones) are directly connected with respective access points (APs), as shown in FIG. 1. Throughout the following, the expression "AP" is used to designate any node, which can provide access for users. It can be for example a Wireless Fidelity (WiFi) AP, a Worldwide Interoperability for Microwave Access (WiMAX) or Wideband Code Division Multiple Access (WCDMA) or Long Term Evolution (LTE) or Universal Mobile Telecommunications System (UMTS) or Global System for Mobile communication (GSM) base station (BS). In WMN, the AP can have an access function and a backhauling function as well, which is also called Mesh AP (MAP). The backhauling functions of APs serve to mesh with other backhauling nodes of the WMN. These backhauling nodes and the APs can be referred to as "mesh nodes", since they all have mesh functions and form a mesh network together. Such wireless mesh networks have received more and more attention due to their fast deployment, low cost, self-organizing, self-configuring and self-healing functionalities. Existing WMNs comprise IEEE 802.11 networks, ad hoc networks, and wireless sensor networks. In Long Term Evolution (LTE) of the Universal Mobile Telecommunications System (UMTS), an X2 interface has been defined for communication among enhanced base stations or enhanced Nodes B (eNBs). Here, interconnections among eNBs essentially form a mesh network, which can be implemented by wireless or wired links.

Furthermore, in WMN, the packet will be received and re-transmitted by an intermediate node (called one hop) before it arrives at destination. Thus the latency from source node to destination node will be much larger than that in case of point-to-point (PTP) or point-to-multi-point (PMP) transmissions. Large latency may impact user feeling and service QoS (quality of service), especially with speech service. Multi-hop transmission may also impact security. Multi-hop may cause an even larger latency in authentication, since the authentication packet has to pass the whole WMN before it arrives at the core network. A very large authentication will result in a handover or re-entry of very large latency. In a word, latency is one of the important issues in WMN, since it is related to service QoS requirement and security topic, e.g. authentication.

In communication systems, authentication is important to prevent sniffer of illegal mesh node, access of illegal users, fraud usage and so on. In a WMN, authentication comprises mesh node authentication, terminal authentication and user authentication. Mesh node authentication can be certification based, while user authentication can be user name/password based. A user may log in the network on different terminals by the same credential (e.g. user name/password). Authentication of a terminal can thus be considered as a combination of node and user authentication, which is used to ensure the validity of the terminal and the user using this terminal.

In general, two types of authentication methods are provided, Pre-Shared Key (PSK) and 802.1x based (i.e. Extensible Authentication Protocol (EAP) based) authentication. An 802.1x based authentication system comprises three functionalities, which are supplicant, authenticator and authentication server (AS). The supplicant corresponds to a user, terminal or mesh node in the authentication process. The authenticator corresponds to an AP in case of user or terminal access, or a mesh node in case of a new node entry, path establishment or topology update. The AS is generally implemented by an AAA (Authentication, Authorization and Accounting) server.

Figure 2:
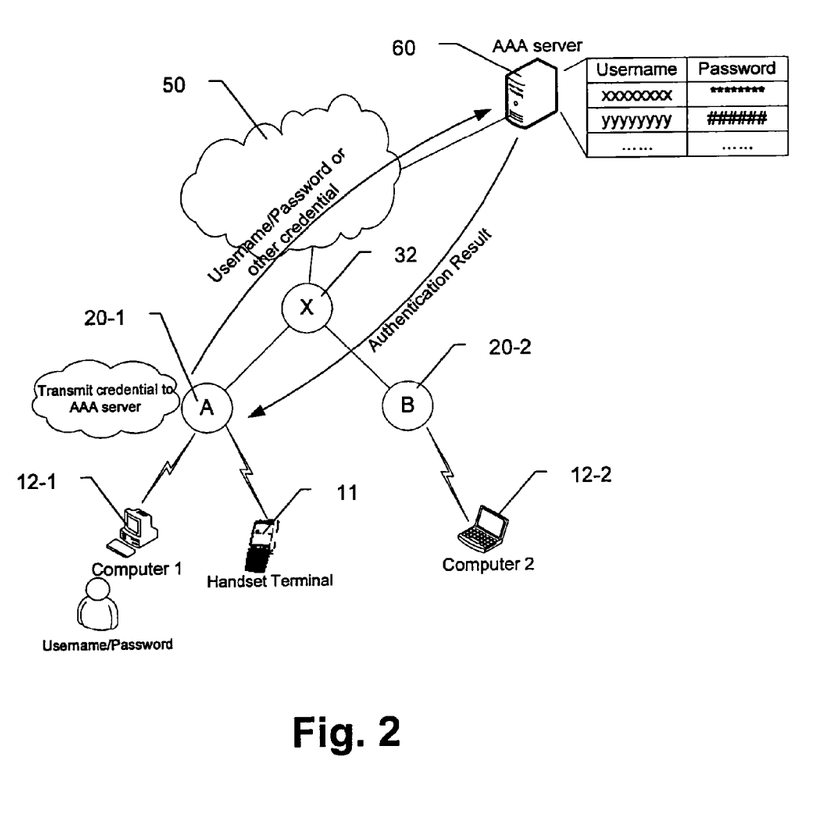
FIG. 2 shows a conventional authentication procedure in a mesh network.

FIG. 2 shows an authentication procedure for a user or a terminal in a mesh network environment. When a user is trying to access the network, he sends his user name and password as credential to an AP (A) 20-1 which provides access to its first computer 12-1 or handset terminal 11. The AP 20-1 forwards the user's credential to an authentication server (AAA server) 60 via a parent node (X) 32 through a backbone network 50. The nodes X, A and B form a very simple mesh network. The authentication server 60 stores a list of authorized user names and passwords and checks the received credential. If it finds out that the user is a legal user, the authentication server 60 notifies the serving AP 20-1 to admit access. Otherwise, the serving AP 20-1 will be notified to reject the requested access.

When the user logs off, the serving AP 20-1 should also notify the authentication server 60 to change the user's status. When the user later logs in on another terminal (e.g. a second computer 12-2) or the same terminal again, the whole authentication has to be redone via the same AP 20-1 or a new AP (B) 20-2 depending on the location of the second computer 12-2. In the above cases, the APs 20-1, 20-2 act as authenticator and the user or terminals 11, 12-1, 12-2 act as supplicant.

Thus, if a person with a WiFi handset device walks into the neighboring WiFi AP, the authentication procedure has to start again. Upon new authentication the connection is lost in case e.g. WiFi Protected Access 2 (WPA2) is involved, since access is only granted as a result of a successful authentication. Thus, all layers above Layer 2 (L2) of the OSI (Open Systems Interconnection) reference model, i.e. Internet Protocol (IP) layer, may be dropped since packets cannot be transmitted during the authentication phase and the application may terminate, e.g., Voice over IP (VoIP) calls may be dropped due to large time delay. Hence, for the terminal or user, some services, such as VoIP, may be terminated at increased possibility during authentication. Moreover, for a mesh node, topology updates will be very slow, since a new link will not be open before a successful authentication. Additionally, since authentication time is dominant in a handoff procedure, continuous high layer services can only be provided in cases of fast authentication during handoff. Since the authentication signaling exchange will pass the whole mesh network, time delays will be even larger before completing authentication.

When the user or terminal logs on again, the whole authentication procedure must be redone, so that authentication will require lots of radio resources and undesired delays if a user or terminal logs in and logs off frequently.

Additionally, it is to be noted that the authentication function is typically implemented in an authentication server. If this server is out of control or damaged, the network can no longer operate in a normal way.

However, a connection may be lost before a successful authentication. The reauthentication process will cause large time delays, especially in case of mesh networks. Therefore, an uninterrupted voice service is hard to provide during handover.

Due to the fact that the signaling exchange will pass through the whole network, many radio resources are required and time delay may be large, since a packet has to pass many network nodes before it arrives at the authentication server. Additionally, during the forwarding procedure, it is hard to guarantee or manage the link status due to multiple hops on the link to the authentication server.

If a user is ill-disposed, e.g. he launches a replay attack, even if the authentication server is powerful enough, many mesh nodes may be involved in forwarding the traffic from this user and may thus may be congested. As a result, the network becomes vulnerable.

So far, several solutions have been proposed to achieve faster re-authentication. Cisco Centralized Key Management (CCKM) has been proposed as a protocol that enables fast re-authentication in infrastructural wireless local area networks (WLANs), whereby the APs do not have to interact with the authentication server in order to re-authenticate a station that previously was authenticated. However, the CCKM has the disadvantage that it is required both in APs and in client devices. Therefore, client devices must be updated to support CCKM, which is a prohibitive requirement in WMNs which should be open to all existing terminals. Additionally, CCKM is designed only for infrastructural WLANs and does not fit to multiple hop relay environments of WMNs.

As another option, a proactive key distribution scheme, as described for example in "Proactive Key Distribution using Neighbor Graphs", IEEE Wireless Communications, vol. 11, issue 1, February 2004, proposed to solve the re-authentication problem during handover. By caching keys in those APs which the user is likely to handover to, it is possible to reduce the authentication signaling and thereby the authentication time. However, the proactive key distribution scheme is unable to cooperate with all current standard authentication processes and needs to modify these existing protocols as well as existing terminals. Moreover, it does not consider specific problems in mesh environments, such as the rules to choose an AP for caching keys. Therefore it needs substantial modification for WMN use cases. Furthermore, the authentication server has to know the neighboring APs and which APs decide to cache the security keys by signaling exchange with these APs.

As a further option, an abbreviated handshake procedure is defined in IEEE P802.11s/D2.0, March 2008, for enabling fast authentication during new link establishment. Network nodes in a small range share the same pairwise master key (PMK), so that fast authentication can be implemented by the pre-shared PMK. However, this procedure is only suitable for link establishment, and traditional authentication has to be done again if the node logs off and re-enters the network later.

Finally, the Internet Engineering Task Force (IETF) Hokey (Handover keying) group has proposed a fast re-authentication procedure specified in RFC 5296, where a key-sharing authentication method is provided between the authentication server and the supplicant. Peer and server mutually verify proof of possession of keying material from an earlier EAP method run. However, again, the supplicant and authenticator both have to be modified.

SUMMARY

Among others, it is an object of the present invention to provide a fast and flexible authentication functionality.

This object is achieved by an apparatus comprising:
receiving means for receiving an authentication request for a user or terminal from an authenticator of a network;
determination means for determining a parent node of said authenticator as an authentication node; and
authorizing means for authorizing said determined authentication node to listen to and store authentication related information of said user or terminal.

Furthermore, the above object is achieved by an apparatus comprising:
receiving means for receiving a listening key;
self-learning means for listening to and storing received authentication related information in a memory by using said listening key;
checking means for checking the content of said memory when an authentication request is detected; and
authentication means for authenticating a user or terminal if said checking means determines a match between authentication related information of said authentication request and authentication related information stored in said memory, and for notifying an authentication server responsible for said authentication request about the authentication result of said authentication means.

Furthermore, the above object is achieved by a method comprising:
selecting a parent node of an authenticator as an authentication node in a network; and
authorizing said authentication node to listen to and store authentication related information exchanged between a user or a terminal and an authentication server in an authentication request.

In addition, the above object is achieved by a method comprising:
listening to and storing received authentication related information in a memory at a selected parent node of an authenticator by using a received listening key;
checking the content of said memory when an authentication request is detected;
authenticating a user or terminal if a match between authentication related information of said authentication request and authentication related information stored in said memory is determined; and
notifying an authentication server responsible for said authentication request about the authentication result at said selected parent node.

Moreover, the above object is achieved by a computer program product comprising code means for producing the steps of the above methods when run on a computing device. This computer program product may be provided on a computer-readable medium or may be downloadable from a communication network (such as the Internet).

Accordingly, when a supplicant logs in the network, a selected parent node of the authenticator can be authorized to store this supplicant's authentication related information. When the supplicant then logs in the network through another authenticator, having the same parent node as the previous authenticator, this parent node can do authentication and feedback the result to the current authenticator and authorization server (if necessary). Consequently, client devices do not have to be updated to support the new authentication functionality which can be implemented in multiple hop relay environments such as WMNs. Neither existing terminals nor existing protocols need to be modified. The proposed fast authentication process has no impact on the supplicant and the authenticator. The authenticator is not aware of the authentication node and does not have to exchange information with the authentication node at the first authentication exchange with the authentication server. The idea is to move the back-end authentication server towards the front end.

Faster re-authentication is thus provided after the supplicant log off. Such a distributed authentication structure further can improve robustness of authentication, especially in WMNs. The authentication functions can be distributed among some selected mesh nodes. Even if the authentication server is broken, the network can still work for a while with the help of the selected authentication nodes, so that some time is left to take measures, e.g., to restart the authentication server.

Additionally, signaling exchange can be reduced to thereby save radio resources. It is apparent that the signaling exchange in the proposed authentication procedure is much simpler than conventional approaches mentioned above and the self-learning function at the selected authentication nodes avoids frequent access to the authentication server. The burden of the authentication server can thus be alleviated.

As the selected authentication node is closer to the access point of the supplicant, time delays of authentication can be shortened. The authentication node can pretend to be a network server to limit illegal attacks to a small range.

Moreover, as regards handover situations, their implementation is facilitated. If a terminal is handed over between two access points having the same authentication node, a very fast handover can be achieved since authentication does not have to be started again.

Conventional approaches for fast re-authentication mentioned above can also be applied to the proposed approach after some minor modifications. Actually, the mesh character of a network can be used and its learning capabilities can also be applied to security contexts. Mesh nodes and access points generally have authentication and security functions. Therefore, the authentication function of the selected authentication node in the suggested approach may easily be implemented on software basis. However, it is to be noted that the proposed fast authentication may as well be applied to wired mesh networks and other types of networks.

The parent node may be determined on the basis of a notification received from a root node controller of the network.

Furthermore, a listening key used for listening to a tunnel connection may be provided, e.g. by the above authorizing means, to the root node controller of the network.

As an alternative, the listening key, used for listening to the tunnel connection, may be received, e.g. by the authorizing means, from the root node controller of the network.

The apparatus may be adapted to use a security key of a secure authorization tunnel to update the security key to be a listening key after successful authentication, and to send authentication related information with the listening key to the user or the terminal.

Additionally, the apparatus may be adapted to classify users or terminals into a low priority set consisting of those authenticated by an authentication node and a high priority set consisting of those authenticated by said apparatus, wherein said apparatus may be adapted to firstly search in said high priority set when an authentication request is received.

The parent node may be selected as an authentication node based on at least one of a distance of the parent node from the apparatus, a distance of the parent node from an access point of the user or the terminal, a geographical location of the parent node within the network, a storage ability of the parent node, a process ability of the parent node, and operation cost of the parent node.

The authentication means may be adapted to forward the authentication request to the authentication server, if the checking means determines no match between the authentication related information of the authentication request and the authentication related information stored in the memory.

Furthermore, the authentication means may be adapted to request authentication related information for the user or the terminal from at least one other authentication node, if the checking means determines no match between the authentication related information of the authentication request and the authentication related information stored in the memory. In a more specific example, the authentication means may be adapted to determine the at least one other authentication node from an information indicating a previous connected access node or authentication node and received from the user or the terminal.

In a handover situation, the authentication means may be adapted to notify an authentication node of a preferred access point for the handover about related authentication related information.

The authentication related information may be stored in the memory together with a unique subscriber identity.

The receiving means may be adapted to receive the listening key in a notification from the authentication server or the root node controller of the network.

To reduce storage requirements, timer means may be provided for counting the time since a storage of the received authentication related information in the memory, wherein the received authentication related information is deleted from the memory after a predetermined time period.

The above apparatus with the authorizing means may be provided in an authentication server of the network.

The above apparatus with the authentication means may be provided in a network node, e.g. a mesh node of a mesh network.

It is noted that the above apparatuses may be implemented by a software controlled processor device or by discrete hardware circuits. The processor device or the hardware circuits may be provided on a single chip or a multi-chip device provided in the respective server or network node.

Other advantageous modifications are defined in the dependent claims or can be gathered from the following description of embodiments.

BRIEF DESCRIPTION OF THE DRAWINGS

The invention will now be described in greater detail based on embodiments with reference to the accompanying drawings in which.

DESCRIPTION OF THE EMBODIMENTS

In the following embodiments of the present invention will be described based on an exemplary and non-limiting WMN environment as depicted in FIG. 1.

According to FIG. 1, client devices or clients, such as computers 12 or mobile phones 11 are connected to APs 20. Here, the APs can be a WiFi AP, a WiMAX BS or the like. In the WMN environment shown in FIG. 1, the APs 20 may have backhauling parts for meshing with some backhauling nodes. Additionally, the WMN environment comprises mesh nodes 30 and enhanced mesh nodes 40 with a gateway functionality for providing access to the Internet 50 or another fixed and/or packet data network. A packet destined to a node in the network hops through multiple mesh nodes to reach its destination.

Further details about operation and function of WMNs can be gathered from e.g. IEEE specifications 802.11, 802.15, or 802.16. However, as already mentioned, the present invention is not restricted to such network types.

According to some embodiments, mesh nodes of the WMN are endued with an ability of authentication. When a supplicant logs in the WMN, a selected parent node of the authenticator will store this supplicant's authentication related information. This stored authentication related information can then be used later when the supplicant logs in again through another authenticator which has the same parent node. Thereby, authentication can be moved from the authentication server (e.g. AAA server) towards the authenticator.

Figure 3:
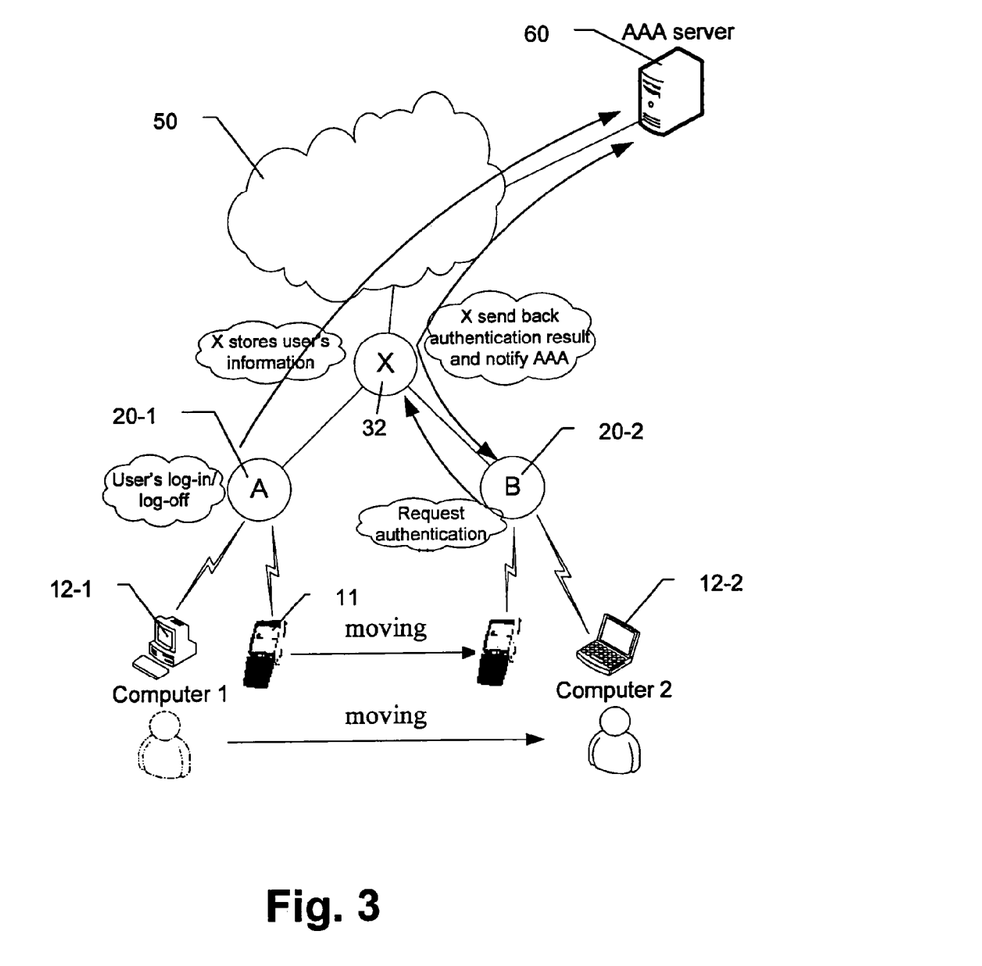
FIG. 3 shows a fast authentication procedure according to an embodiment.

FIG. 3 shows a more detailed example of the authentication procedure, for the case that a user moves from a first computer 12-1 to a second computer 12-2 or with his mobile phone 11. If the user on the first computer 12-1 logs in to the WMN for the first time, a first AP (A) 20-1 will send its credential (such as user name, password, or related information) to an allocated AAA server 60 through the mesh network and possibly also the Internet 50 for authentication. The AAA server 60 will feedback the authentication result. During these procedures, it is assumed that a parent node (X) 32 of the first AP 20-1 has been authorized by the AAA server 60 to listen to and store this user's or terminal's authentication related information, if the user is legal.

When the user of the first computer 12-1 or with his/her mobile phone 11 logs off from the network, the first AP 20-1 notifies the AAA server 60 to change this user/terminal's status. Now, it is assumed that the user moves to the second computer 12-2 or uses his/her mobile phone 11 at a new location or place. When the user logs in at the new place covered by the second AP (B) 20-2, he/she will ask for authentication. When the new authentication request from the second AP 20-2 passes the parent node (X) 32, it will detect the authentication request and checks its internal storage or memory content. If the parent node 32 finds this user/terminal's authentication related information, it can do authentication and notify the second AP 20-2 about the result. If the user/terminal is determined to be legal, the parent node 32 will notify the AAA server 60 about the result and indicate that the second AP 20-2 will admit this access. The latter is an optional function.

Otherwise, if the parent node 32 cannot find any matching authentication related information for this user/terminal, it may continue to forward the information to the AAA server 60 or alternatively it may ask other selected authentication nodes for this user/terminal's information.

When the same user/terminal logs in via the first access point 20-1 again, the first access point 20-1 will ask for authentication for this user. When the authentication request passes the parent node 32, this parent node 32 will check its stored authentication related information and repeat the above procedure.

The above second alternative for the case that the parent node 32 cannot find a matching authentication related information can be achieved as follows. The supplicant can be configured to provide information about the previous connected access node or authentication node when it tries to log in to the WMN to avoid broadcast or multicast among authentication nodes and thereby facilitate the provision of information about other authentication nodes. For example, in FIG. 3, the mobile phone 11 moved from the first AP 20-1 to the second AP 20-2. Having moved to the second AP 20-2, it could send out the authentication related information and tell the network that the first AP 20-1 was its previous AP, or that the parent node 32 was its previous authentication node. When the authentication node of the second AP 20-2 receives this information, it can send the authentication request to its previous authentication node for its authentication related information.

As an alternative approach, when the terminal or network decided on a preferred AP for handover, it can tell the current authentication node to notify the authentication node of the preferred AP about the related authentication related information. This could also be done by the current authentication node itself. In case of a mesh node, the network or mesh node may select the preferred node that the mesh node will connect to. The network or mesh node could then inform or instruct the current authentication node to notify the authentication node of the preferred mesh node about the related authentication related information. Again, this could be done as well by the current authentication node itself.

The above authentication procedure has been described for the case of a normal supplicant login. If an illegal user launches an attack to the network, the authentication node could easily pretend to be a network server, so that the attack can be limited to a small range. For example, if the illegal user launches a replay attack, it will be terminated at the authentication node.

To recapitulate, it has been proposed above to have specific nodes in the network (e.g. parent nodes) to act as an authentication cache. Thereby, each single authentication request, e.g. RADIUS (Remote Authentication Dial In User Service) request, does not have to be transferred to an authentication server. Like routers learn about the network structure by spoofing Internet Protocol (IP) packet headers, these specific authentication nodes, when in the path of a mesh connection, will learn about security contexts. Instead of updating routing tables these authentication nodes will update "security context tables". They store detected authentication related information together with unique subscriber identities like Media Access Control (MAC) addresses. When the authentication nodes discover an authentication request floating around and find a matching entry in their security context table, they will act on behalf of the authentication server (e.g. RADIUS server). In these cases no authentication will be processed, but pre-processed data of a valid authentication will be reused. In this way, a very fast authentication procedure can be provided, which is helpful for handover situations.

Thus, the selected authentication nodes may have functions of self-learning authentication related information in the concerned network, including authentication related information, authorization information and even keys. They provide fast authentication for network access and notify APs and authentication servers about the result. As an additional option, they may fetch authentication related information of a new supplicant from its previous authentication node by mutual communication among authentication nodes.

Authentication nodes may be selected by the concerned network (e.g. mesh network) or by the authentication server. In the latter case, the authentication server needs to learn the network topology, especially in case of connecting with several networks. In the above first case, the selection function of the network may be implemented by a root node controller which is a physical or logical entity to control the whole mesh network. Since this functionality is always located at the egress node side, it is called "root node controller".

Figure 4:
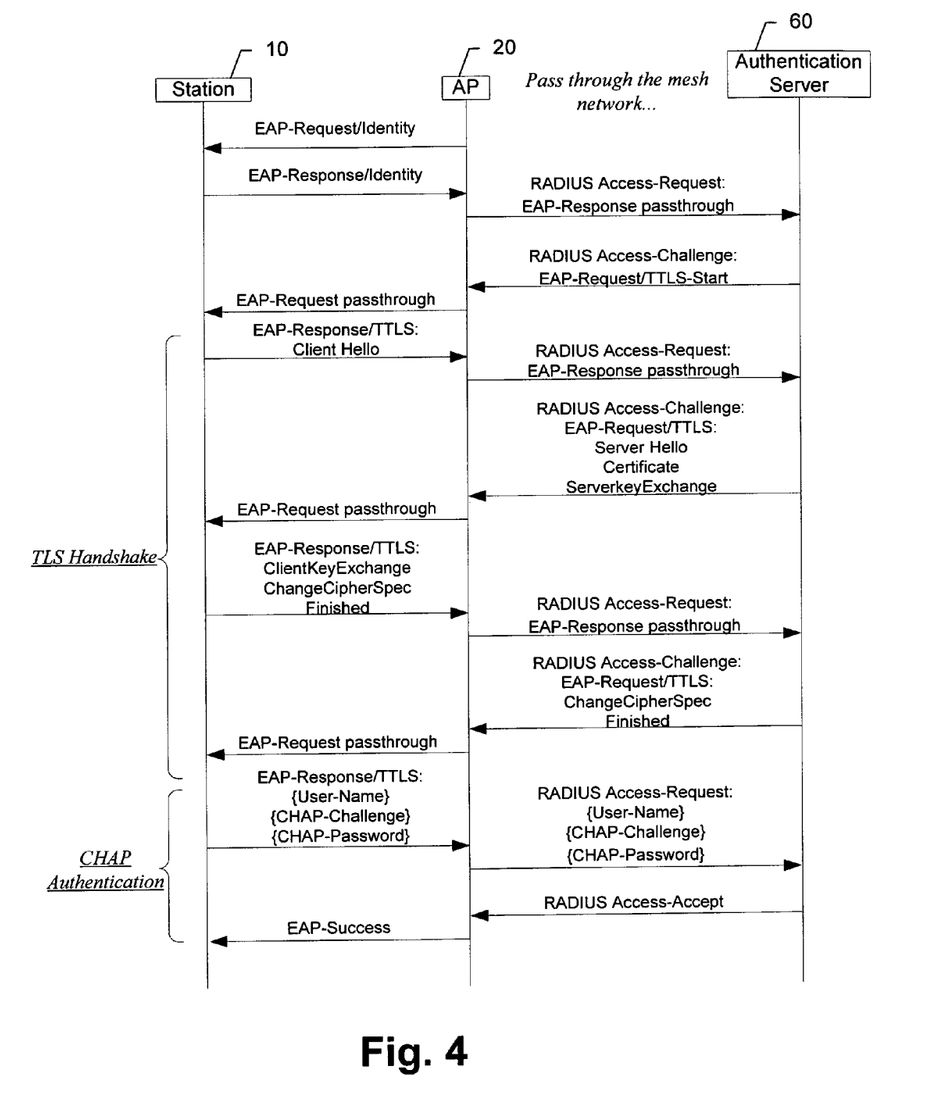
FIG. 4 shows a signaling diagram of a exemplary authentication procedure.

FIG. 4 shows a signaling diagram according to an EAP procedure which has been developed by the Internet Engineering Task Force (IETF). More specifically, the procedure shown in FIG. 4 relates to an EAP Tunneled Transport Layer Security (EAP-TTLS) procedure which offers very good security. The client does not need to be authenticated via a signed certificate to the server, but only the server to the client. This greatly simplifies the setup procedure as a certificate does not need to be installed on every client. EAP-TTLS is widely used for 802.1x based authentication due to its feasibility and high level security. The procedure consists of several messages exchanged between a station or terminal 10 and an AP 20, and a plurality of messages exchange between the AP 20 and the authentication server 60 and which consequently have to pass through the whole mesh network. The detailed signaling exchange of EAP-TTLS and an additional challenge-handshake authentication protocol (CHAP) for authenticating a user or network host to an authenticating entity is shown in FIG. 4. Basically, the client (e.g. station 10) authenticates the authentication server 60 based on its certificate. Then, the client generates a security key and distributes it with the server's certificate to build a security tunnel. Finally, the client credential is transmitted through this tunnel for authentication. Here, the client credential is assumed to be a user name and password. Moreover, a TLS handshake procedure and a CHAP authentication procedure are separately indicated in the diagram.

A special feature of the authentication node according to the proposed fast authentication procedure is its ability of self-learning. To achieve this, the authentication nodes are given authorization to listen to the signaling exchange. This authorization can be achieved by three alternative options.

As the first option, the root node controller could select authentication nodes according to the network topology and notify the authentication server about the selected authentication nodes. The authentication server and all authentication nodes can then generate and use a same security key to build a tunnel.

As a second option, the authentication server may notify the root node controller about the security key which has been used to build the security tunnel between the authentication server and authentication nodes. Then, the root node controller selects authentication nodes according to the network topology and informs them about the security key.

As a third option, the root node controller could select authentication nodes according to the network topology and could generate the security key. Then, the root node controller notifies authentication nodes and the authentication server about the security key which shall be used to build the security tunnel between the authentication server and the authentication nodes.

When the security key is used by the authentication nodes for listening to authentication related information, it may as well be called "listening key".

Figure 5:
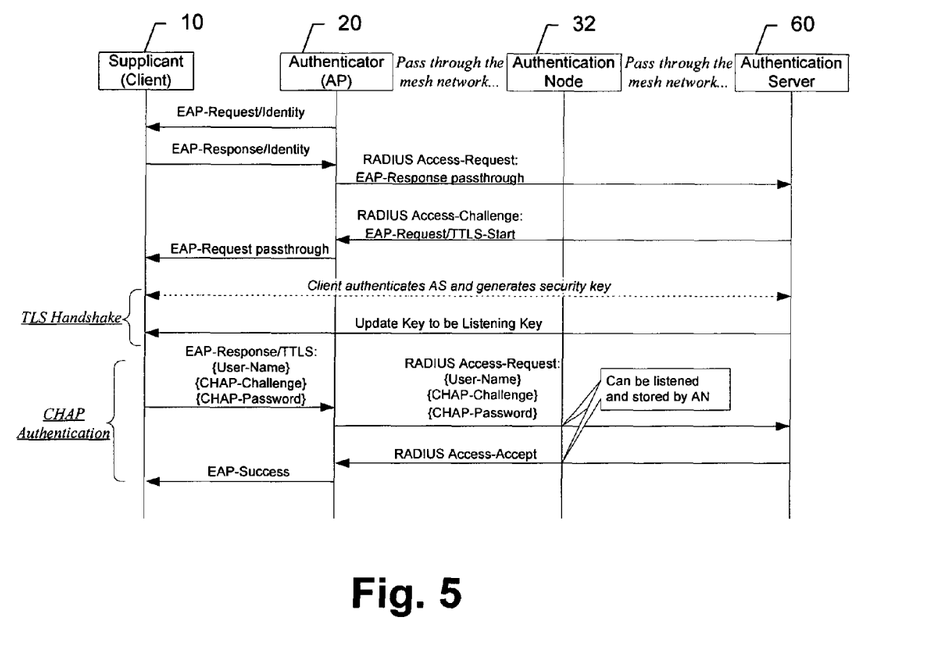
FIG. 5 shows a signaling diagram for a first authentication with an selected authentication node according to an embodiment.

FIG. 5 shows a signaling diagram of a first authentication when the proposed authentication node is involved in a procedure according to the above EAP-TTLS authentication approach of FIG. 4.

In the signaling procedure of FIG. 5 it is assumed that the authentication node 32 has already been authorized by the authentication server 60 to listen and store detected authentication related information.

During EAP-TTLS authentication, the client 10 generates a security key, encrypts it with a server certificate and sends it to the authentication server 60. This security key is used to build a security tunnel between the authentication server 60 and the supplicant or client 10. In response thereto, the authentication server 60 updates the security key to be a listening key and notifies the client 10. Now, during the CHAP authentication signaling, the authentication node can listen to the RADIUS access request with user name and password and to the RADIUS access accept response from the authentication server 60 and can store this authentication related information in its internal memory for later use.

Thus, during a first authentication procedure, the authentication node 32 can self-learn the authentication related information. After successful authentication, the authentication node 32 has no way to listen to the Pairwise Transient Key (PTK) generation procedure. It can only know authentication related information.

According to an alternative procedure (not shown in FIG. 5), the client 10 may generate a security key and may encrypt it with a server certificate. This key can be used to build a security tunnel between the authentication server 60 and the client 10. The authentication related information can then be exchanged through this tunnel. After successful authentication, the authentication server 6 can update the security key to be the listening key. It may send the credentials to the client 10 with the listening key. As there is the authentication node 32 in the path, the authentication node 32 will self-learn this credential. The credential (e.g. user name, password) can then be used for fast re-authentication.

Figure 6:
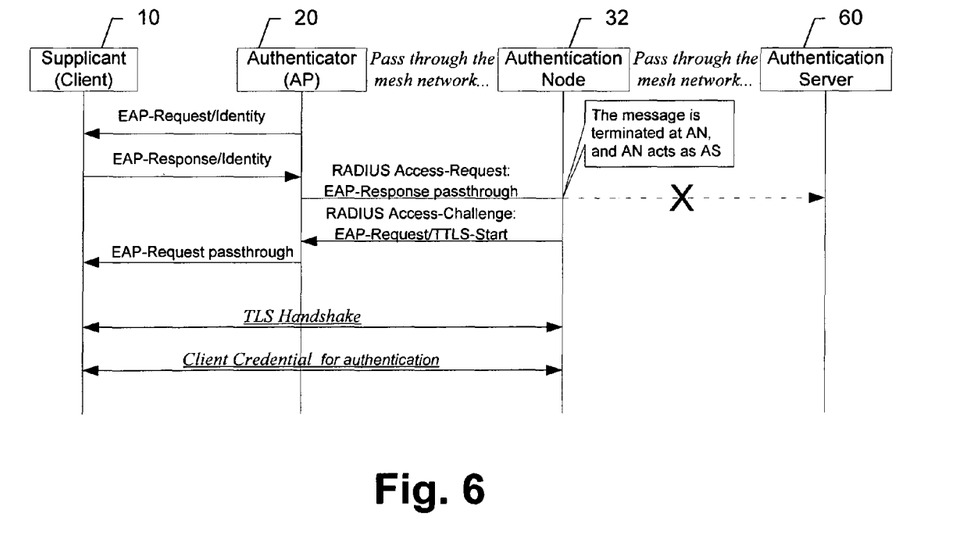
FIG. 6 shows a signaling diagram for a subsequent authentication in the selected authentication node according to the embodiment.

FIG. 6 shows a signaling diagram for a fast re-authentication according to the EAP-TTLS approach with involvement of the authentication node 32.

When the client 10 re-enters the network (maybe at a different AP), it starts the usual processing. When the AP or authenticator 20 forwards the EAP Response/Identity message to the authentication server 60, the authentication node 32 can listen to this information. If the authentication node 32 detects that it has stored authentication related information for this client, it will terminate this message and act as an authentication server. Thus, no further signaling needs to pass through the mesh network to the authentication server 60. The client credential can be user name/password, pre-defined credential for fast re-entry, etc.

It is noted that the authentication node 32 can be authorized by the authentication server 60, and the information exchange between the authentication server 60 and the authentication node 32 can be made secure since they will build a secure tunnel. Thus, the listening key can be distributed to the authentication node 32 in a secure manner.

Since the authentication node 32 does not participate in the authentication between a client and the authentication server 60, a very simple and straight forward way is to update the key used for the TLS tunnel to be the listening key, so that the authentication node 32 can self-listen and self-study the user information. Hence, the listening key is just used to authorize the authentication node 32 to have ability to listen to the secured information exchange in the TLS tunnel, or, to self-learn what the authentication server 60 want the authentication node to know.

In addition, an alternative method to use the listening key can be provided. After completing EAP-TTLS authentication, the authentication server 60 may update the security key to be the listening key. It then uses the listening key to transmit credentials, which are used for fast re-authentication, towards the client, so that the authentication node 32 can listen and study by itself. This procedure may run after the whole EAP-TTLS authentication, so that it will not break the TTLS tunnel at all, and is independent. The listening key may be refreshed after each use to ensure its security level. In fact, the authentication server 60 can thus control which information should be learned by the authentication node 32 based on this listening key.

During re-authentication, the authentication node 32 will take the place of the authentication server 60, and a security tunnel will be built between the authentication node 32 and the client. Since the authentication request can be sent by clear text, the authentication node 32 can know that a user is initiating the authentication request and can authenticate this user.

Figure 7:
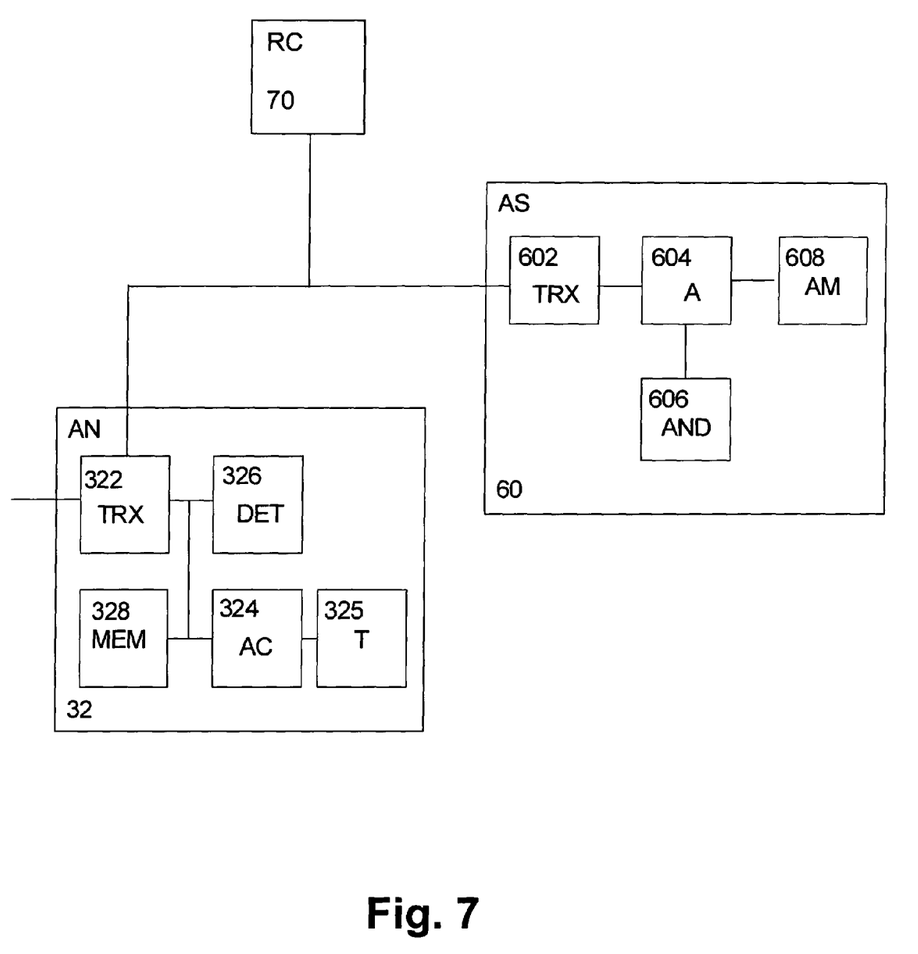
FIG. 7 shows schematic block diagrams of an authentication node and an authentication server according to an embodiment.

FIG. 7 shows a schematic block diagram of an authentication node 32 and an authentication server 60 according to an embodiment. It is noted that the functions of the authentication node may be provided in any mesh node or only in selected mesh nodes and can be activated upon authorization of the network node as an authentication node. The authentication server 60 is connected directly via the concerned network (e.g. mesh network) or via the Internet 50 and the concerned network to the authorization node 32.

At the authentication node 32 a transmit and receive function is provided by a corresponding transceiver (TRX) unit 322 by which information can be received from an AP (not shown) or from a root node controller 70 or from the authorization server 60. Additionally, information can be transmitted to these nodes. A self-learning mechanism or means is provided by a detection unit or function (DET) 326 which listens to messages routed through the or received by the authentication node 32, detects received authentication related information, and stores it in a memory unit (MEM) 328 provided for storing credentials (e.g. user name, password etc.) in relation to a unique user or subscriber identity. When the detection unit or function 326 detects an authorization request, it controls an authentication control unit or function (AC) 324 to check the content of the memory unit 328 and when a match is determined, the authentication control unit or function 324 acts as authentication means and authenticates the respective client (e.g. user or terminal) and notifies the authentication server 60 responsible for the authentication request. Additionally, a timer (T) 325 may optionally provided for counting a time period since the storing of an authentication related information and for controlling the authentication control unit or function 324 to delete a memory entry when a predetermined time period has expired.

The authentication server 60 includes a transceiver (TRX) 602 for transmitting and receiving information from the concerned network directly or via the Internet 50. Furthermore, the authentication server 60 comprises an authentication unit or function (A) 604 for providing authentication functionality required for authenticating a client. Additionally, an optional authentication node determination unit or function (AND) 606 may be provided for the case that the authentication server 60 is responsible for selecting a parent node of the authenticator as the concerned authentication node. This authentication node determination may be based on a corresponding notification received from the root node controller 70. Additionally, an authentication memory (AM) 608 is provided for storing credentials of authenticated clients (e.g. in a lookup table) for use in later authentication procedures.

The determination of the authentication node in the corresponding authentication node determination unit or function 606 may be based on the above three alternative options.

Figure 8:
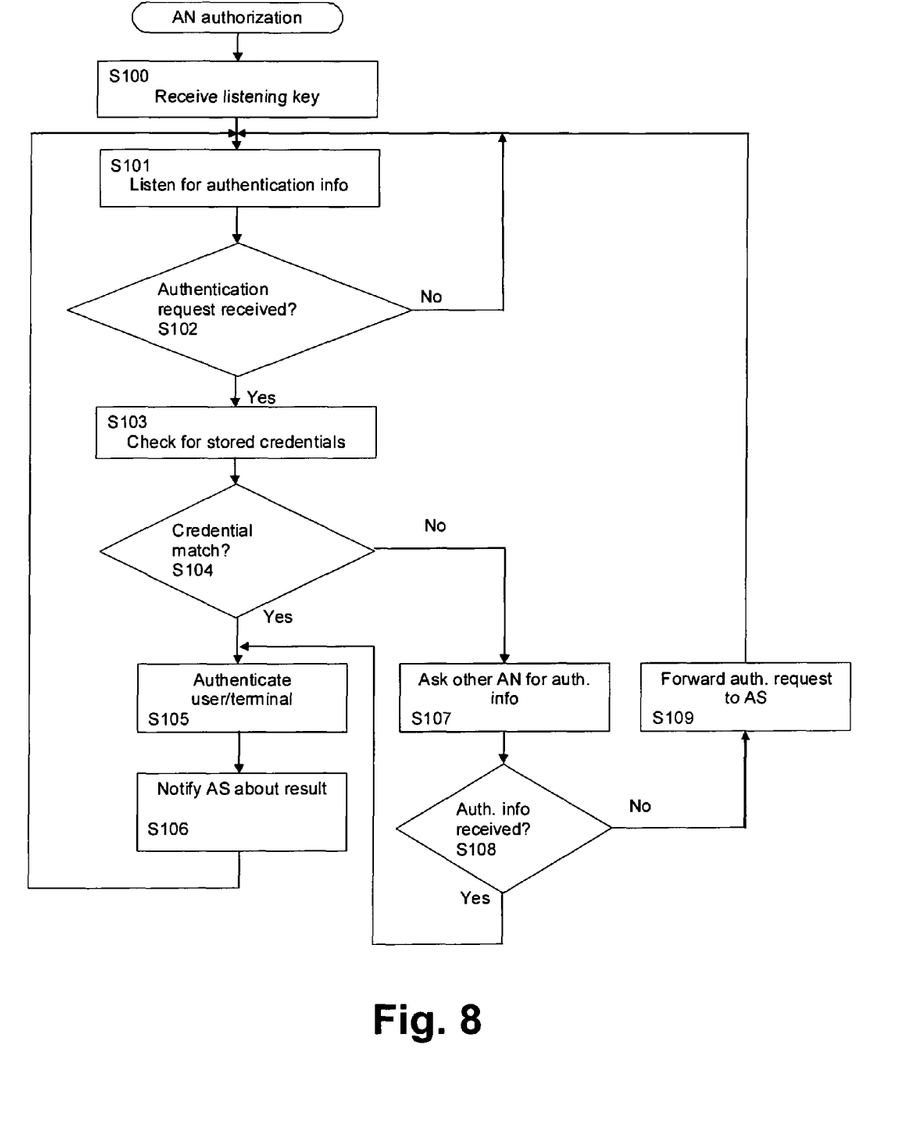
FIG. 8 shows a flow diagram of an authentication procedure at an authentication node according to an embodiment.

FIG. 8 shows a schematic flow diagram of an authentication procedure as performed in the authentication node 32, according to an embodiment.

The procedure is initiated when the authentication node 32 has been authorized as authentication node. In a first step S100, the authentication node 32 may receive a listening key e.g. from the authentication server 60 as described above. Then, in step S101, the authentication node 32 listens for authentication requests. When an authentication request has been detected in a following step S102, the authentication node 32 checks its internal memory unit (e.g. memory unit 328 of FIG. 7) for any matching credential (step S103).

Steps S101 and S102 are repeated until an authentication request has been received.

In step S104 it is determined whether matching credentials are stored in the authentication node 32. If so, the corresponding terminal/user of the authentication request is authenticated in step S105 and the authentication server and possibly also the AP of the authenticated terminal/user are notified about the result (step S106).

If no matching credential is stored in the authentication node 32, other authentication nodes may be asked for the required authentication related information (step S107). If it is determined in step S108 that authentication related information is received from other authentication nodes, the procedure continues at step S105 and the concerned terminal/user is authenticated. Then, the procedure jumps back to step S101. Otherwise, if no authentication related information is received in step S108, the authentication node 32 may forward the authentication request with the credential to the authentication server 60 in step S109 and the procedure jumps back to step S101 to listen for any further authentication request.

It is noted that in practice, the signaling exchange during the proposed authentication procedure may be different from the signaling shown in FIGS. 4 to 6. The basic self-learning mechanism at the selected authentication node(s) may be implemented in any kind of authentication procedure between a client and an authentication server.

Since the authentication node 32 notifies the authentication server 60 about the authentication result, the authentication server 60 may classify users into a low priority set of those users authenticated by authentication nodes, and a high priority set of those users authenticated by the authentication server itself. Thus, in response to the notification of an authentication node, the authentication server 60 will set the related user information into its low priority set. Then, when the authentication server 60 receives an authentication request, it may firstly search in the high priority set and then, if no match is found, the search may continue in the low priority set.

The selection of the authentication node may be performed so that it is not too close to the authentication server and not too far from the serving AP. If the authentication node is too close to the authentication server, the signaling will pass through most parts of the network before it arrives at the selected parent node (i.e. authentication server).

Figure 9A:
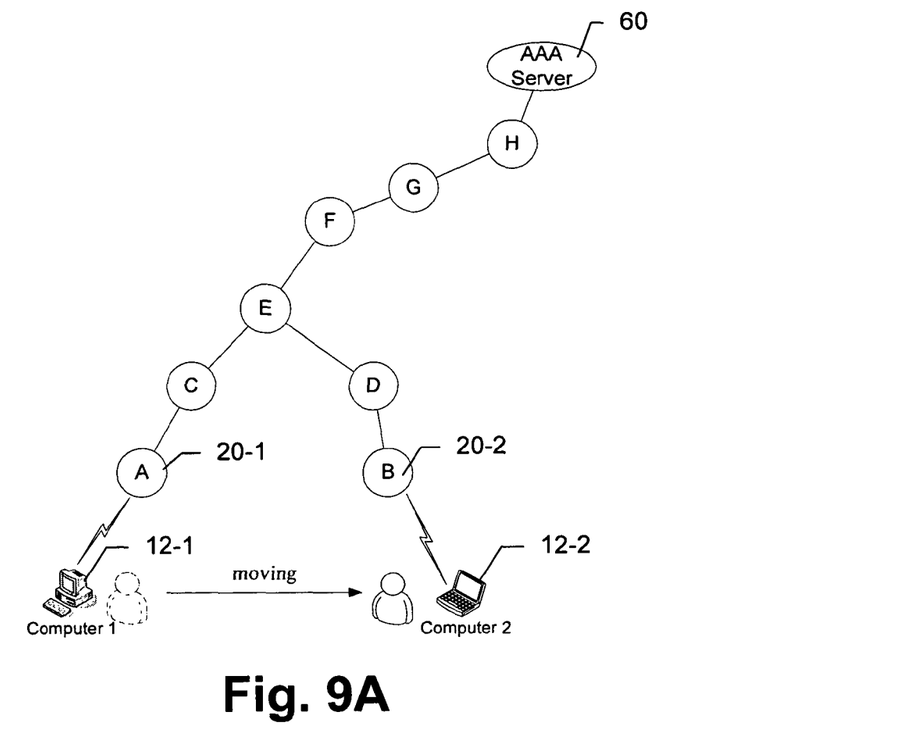
FIGS. 9A and 9B show two examples for selection of an authentication node.

FIGS. 9A and 9B shows examples for selecting an authentication node. In FIG. 9A, nodes E, F, G, and H can be selected as common parent node of a first access node (A) 20-1 and a second access node (B) 20-2 when a user moves from a first computer 12-1 to a second computer 12-2. However, it could be desirable to select node E, since nodes F, G and H are too close to the authentication server 60.

Figure 9B:
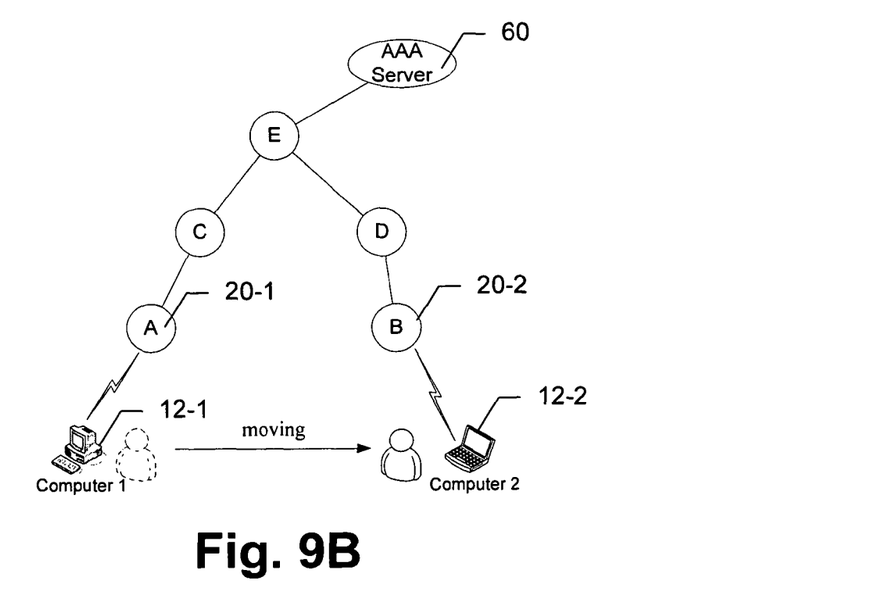

In FIG. 9B, node E is the common parent node of the first and second access nodes 20-1 and 20-2. However, here node E may be too close to the authentication server 60. When the signaling arrives at node E, it has passed through most parts of this network. Thus, selection of an authentication node may not be necessary in this case.

Additionally or alternatively, the authentication node may be selected based on the geographic locations of respective network nodes.

Additionally or alternatively, selection of the authentication node may also consider storage, process ability and operating cost of respective network nodes. The authentication node may be the common parent node of two APs, three APs or more APs. However, more APs have more users, which requires more storage and process ability and higher operating costs of the selected authentication node.

In practice, the aforementioned three selection criteria may be considered all together.

The above proposed fast authentication mechanism can be improved or modified based on the following aspects.

The terminal or client may inform the network about previous connected access node or authentication node to access the network again. Based on this information, the credential can be fetched by the new authentication node without requiring access to the authentication server. It is noted that the authentication server not necessarily needs to be the AAA server. It can be any other server with an authentication function.

Furthermore, selected authentication nodes may be changed when the network topology is changed. Therefore, selection by the root node controller of a mesh network can be advantageous.

Furthermore, the proposed procedure can be enhanced by having a new AP firstly request the desired user information from other APs. If there is no user information available in other APs, then the current AP requests authentication from the authentication server.

Figure 10:
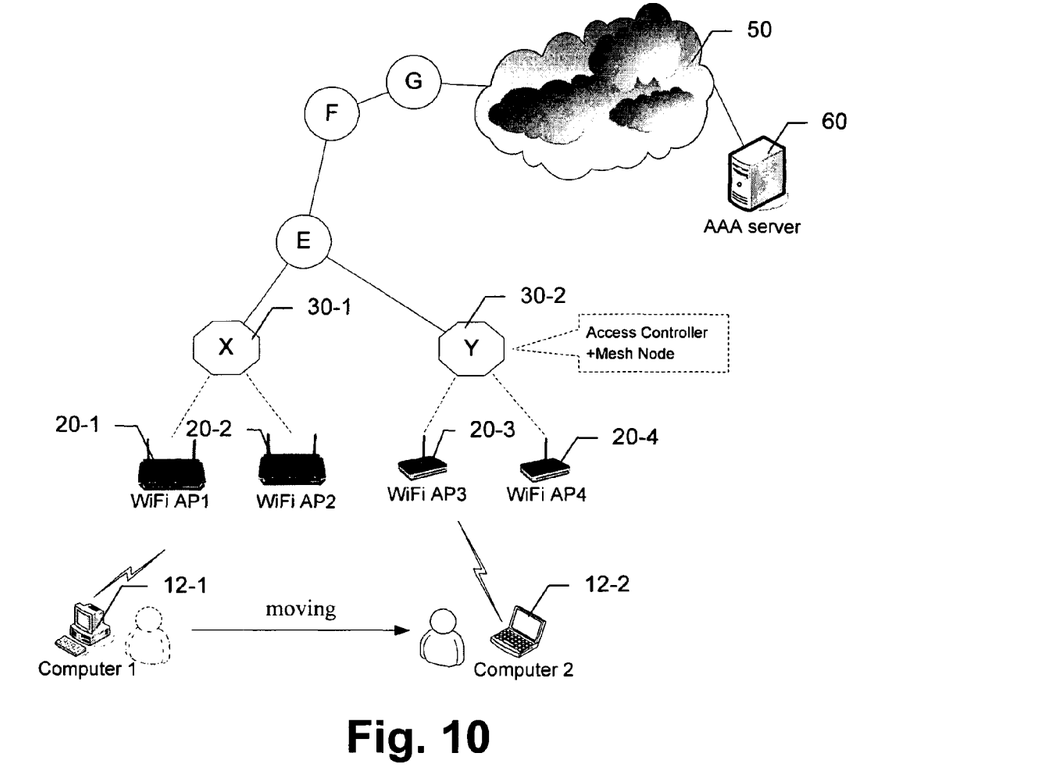
FIG. 10 shows a selection of an authentication node in a specific environment.

FIG. 10 shows an exemplary WiFi environment where a WiFi AP may be operated in a "thin AP" mode or "split MAC" mode, which means that access controllers (ACs) 30-1, 30-2 are used to coordinate and manage affiliated APs. In this case, the authentication node can be selected as a proper parent node of the access controllers 30-1 and 30-2.

In the example of FIG. 10, WiFi APs 1, 2, 3 and 4, 20-1 to 20-4, are managed by respective access controllers (X) 30-1 and (Y) 30-2, which are formed by corresponding mesh nodes. Here, instead of the access controllers 30-1 and 30-2, node E can be selected as authentication node.

In case of an open access, the authentication client (e.g. RADIUS client) can be located in other concentrating entities, such as the access controllers 30-1 and 30-2 of FIG. 10.

If there are more than one authentication node along a path from the authentication client to the authentication server, the authentication node located next to the client may authenticate the client. Then, other authentication node(s) located further away from the client will not authenticate the client and will delete this client's authentication related information after some time (if they have stored this information).

Figure 11:
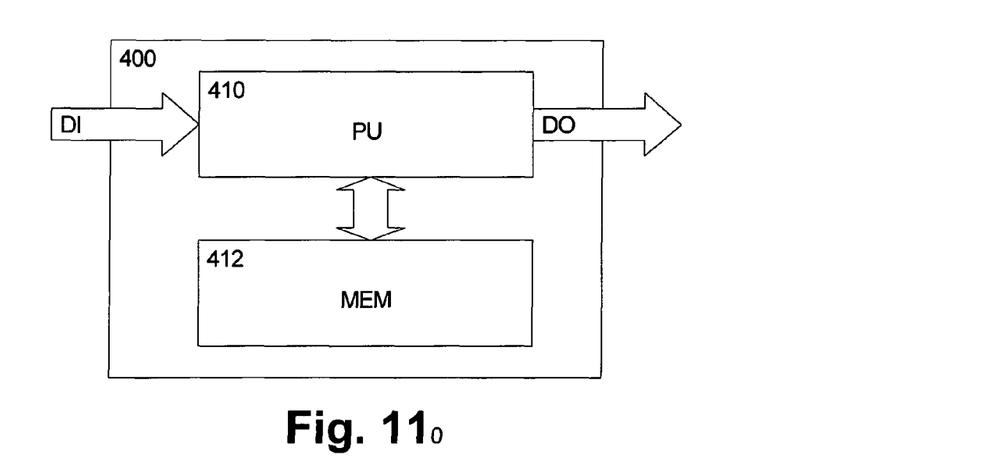
FIG. 11 shows a schematic block diagram of a software-based implementation according to another embodiment.

FIG. 11 shows a schematic block diagram of an alternative software-based implementation according to another embodiment. The required functionality can be implemented in any network node 400 with a processing unit 410, which may be any processor or computing device with a control unit which performs control based on software routines of a control program stored in a memory 412. The control program may also be stored separately on a computer-readable medium. Program code instructions are fetched from the memory 412 and are loaded to a control unit of the processing unit 410 in order to perform the processing steps of the specific authentication functionalities described in connection with FIGS. 3 to 8, which may be implemented as the above mentioned software routines. The processing steps may be performed on the basis of input data DI and may generate output data DO. In case of the processing performed at the authentication node, the input data DI may correspond to an authentication signaling received from an authentication server or an authentication client, and the output data DO may correspond to a granted authentication for the concerned client. In case of the processing performed at the authentication server, the input data DI may correspond to an authentication request received from an authentication client and the output data DO may correspond to an authorization signaling directed to a selected authentication node.

Consequently, the functionalities of the above embodiments of the authentication node and the authentication server may be implemented as respective computer program products comprising code means for generating each individual step of the processing and/or signaling procedures for the respective entities or functions when run on a computer device or data processor of the respective entity.

In summary the present invention relates to methods, apparatuses, and computer program products for providing secure access of a user or terminal to a network, wherein an intermediate authentication node is authorized to listen to and store authentication related information. When an authentication request is received, the stored authentication related information is checked and the user or terminal is authenticated if a match between authentication related information of the authentication request and the stored authentication related information is determined, and an authentication server responsible for the authentication request is notified about the authentication result.

It is apparent that the invention can easily be extended to any network environment where an authentication is achieved between a client and an authentication server, resulting in time delay caused by the large network size. The invention is not intended to be restricted to the specific messages explained in connection with FIGS. 4 to 6 and can be extended to any corresponding authentication procedure. In addition, the invention is not limited to an authentication signaling as such can be implemented in any network access procedure where security information is to be exchanged between a requesting client and a granting server. It may cover authentication, authorization and any other kind of similar secure access procedure. The expression "authentication" used above is intended to cover any procedure for securing network access by exchanging security related information. The term "authentication" used in the following claims shall thus be interpreted in a broad manner covering any of the above security-related access procedures. Additionally, the term "network" used in the following claims is intended to cover any type of network, such as mesh networks, ad hoc networks, multi-hop networks, cellular networks and other networks network having an access procedure where security information is to be exchanged between a requesting client and a granting server

The invention claimed is:

1. An apparatus comprising:
receiving means for receiving an authentication request for a user or terminal from an authenticator of a network;
determination means for determining a parent node of said authenticator as an authentication node; and
authorizing means for authorizing said determined authentication node to listen, via a listening key, and store authentication related information of said user or terminal, wherein the apparatus is configured to use a security key of a secure authorization tunnel, to update the security key to be a listening key for listening to and storing authentication related information after successful authentication, and to send authentication related information with the listening key to the user or the terminal to be used for subsequent re-authentication of the user or the terminal.

2. The apparatus according to claim 1, wherein said determination means is configured to determine said parent node on the basis of a notification received from a root node controller of said network.

3. The apparatus according to claim 1, wherein said authorizing means is configured to provide the listening key, used for listening to a tunnel connection, to a root node controller of said network.

4. The apparatus according to claim 1, wherein said receiving means is configured to receive a listening key, used for listening to a tunnel connection, from a root node controller of said network.

5. The apparatus according to claim 1, wherein said apparatus is configured to classify users or terminals into a low priority set consisting of those authenticated by an authentication node and a high priority set consisting of those authenticated by said apparatus, and wherein said apparatus is configured to firstly search in said high priority set when an authentication request is received.

6. The apparatus according to claim 1, wherein said determination means is configured to select said parent node as an authentication node based on at least one of a distance of said parent node from said apparatus, a distance of said parent node from an access point of said user or said terminal, a geographical location of said parent node within said network, a storage ability of said parent node, a process ability of said parent node, and operation cost of said parent node.

7. An apparatus comprising:
upgrading means for receiving a security key and upgrading to a listening key;
self-learning means for listening to and storing received authentication related information in a memory of the listening key;
checking means for checking the content of said memory when an authentication request is detected; and
authentication means for authenticating a user or terminal if said checking means determines a match between authentication related information of said authentication request and authentication related information stored in said memory, and for notifying an authentication server responsible for said authentication request about the authentication result of said authentication means.

8. The apparatus according to claim 7, wherein said authentication means is configured to forward said authentication request to said authentication server, if said checking means determines no match between said authentication related information of said authentication request and said authentication related information stored in said memory.

9. The apparatus according to claim 7, wherein said authentication means is configured to request authentication related information for said user or said terminal from at least one authentication node, if said checking means determines no match between that said authentication related information of said authentication request and said authentication related information stored in said memory.

10. The apparatus according to claim 9, wherein said authentication means is configured to determine said at least one authentication node from an information indicating a previous connected access node or authentication node and received from said user or said terminal.

11. The apparatus according to claim 7, wherein said authentication means is configured to notify an authentication node of a preferred access point for handover about related authentication related information.

12. The apparatus according to claim 7, wherein said authentication related information is stored in said memory together with a unique subscriber identity.

13. The apparatus according to claim 7, wherein said receiving means is configured to receive said listening key in a notification from said authentication server or a root node controller.

14. The apparatus according to claim 7, further comprising timer means configured to count the time since a storage of said received authentication related information in said memory, wherein said received authentication related information is deleted from said memory after a predetermined time period.

15. An authentication server comprising an apparatus according to claim 1.

16. A network node comprising an apparatus according to claim 7.

17. A method comprising:
selecting a parent node of an authenticator as an authentication node in a network
authorizing said authentication node to listen, via a listening key, to and store authentication related information exchanged between a user or a terminal and an authentication server in an authentication request; and
re-authenticating, via the authentication node, the user or the terminal when the authentication related information stored in the listening key matches authentication related information in a subsequent authentication request of the user or the terminal.

18. A method comprising:
upgrading a received security key to a received listening key;
listening to and storing received authentication related information in a memory at a selected parent node of an authenticator by using the received listening key;
checking the content of said memory when an authentication request is detected;
authenticating a user or terminal if a match between authentication related information of said authentication request and authentication related information stored in said memory is determined; and
notifying an authentication server responsible for said authentication request about the authentication result at said selected parent node.

19. A non-transitory computer program product comprising code means for generating the steps of claim 17 when run on a computing device.

20. An authentication system comprising at least one network node according to claim 16 and at least one authentication server, said authentication server comprising:
- receiving means for receiving an authentication request for a user or terminal from an authenticator of a network;
- determination means for determining a parent node of said authenticator as an authentication node; and
- authorizing means for authorizing said determined authentication node to listen and store authentication related information of said user or terminal.

21. A non-transitory computer program product comprising code means for generating the steps of claim 18 when run on a computing device.

\* \* \* \* \*